(12) United States Patent
Cross et al.

(10) Patent No.: US 11,952,314 B2
(45) Date of Patent: Apr. 9, 2024

(54) ENHANCED ADHESIVE DRYWALL FINISH AND JOINT COMPOUND AND METHOD OF USE

(71) Applicants: Sheila Cross, Colleyville, TX (US); Kory Ehlert, Pardeeville, WI (US)

(72) Inventors: Sheila Cross, Colleyville, TX (US); Kory Ehlert, Pardeeville, WI (US)

( * ) Notice: Subject to any disclaimer, the term of this patent is extended or adjusted under 35 U.S.C. 154(b) by 301 days.

(21) Appl. No.: 17/685,017

(22) Filed: Mar. 2, 2022

(65) Prior Publication Data

US 2022/0281772 A1 Sep. 8, 2022

Related U.S. Application Data

(60) Provisional application No. 63/155,538, filed on Mar. 2, 2021.

(51) Int. Cl.
| | |
|---|---|
| *C04B 14/22* | (2006.01) |
| *C04B 14/04* | (2006.01) |
| *C04B 14/10* | (2006.01) |
| *C04B 14/28* | (2006.01) |
| *C04B 14/30* | (2006.01) |
| *C04B 24/24* | (2006.01) |
| *C04B 24/26* | (2006.01) |
| *C04B 28/14* | (2006.01) |
| *C04B 111/00* | (2006.01) |

(52) U.S. Cl.
CPC ............ *C04B 28/14* (2013.01); *C04B 14/042* (2013.01); *C04B 14/106* (2013.01); *C04B 14/22* (2013.01); *C04B 14/28* (2013.01); *C04B 14/303* (2013.01); *C04B 24/24* (2013.01); *C04B 24/2623* (2013.01); *C04B 2111/00482* (2013.01); *C04B 2111/00637* (2013.01); *C04B 2111/00681* (2013.01)

(58) Field of Classification Search
CPC ..... C04B 28/14; C04B 14/042; C04B 14/106; C04B 14/22; C04B 14/28
See application file for complete search history.

(56) References Cited

U.S. PATENT DOCUMENTS

| | | | | |
|---|---|---|---|---|
| 2014/0275369 | A1* | 9/2014 | Stewart | C04B 24/12 106/471 |
| 2020/0156999 | A1* | 5/2020 | Donovan | C04B 28/02 |
| 2021/0230067 | A1* | 7/2021 | Huch | C04B 28/14 |

FOREIGN PATENT DOCUMENTS

WO   WO-2011/121027 A1 * 10/2011

* cited by examiner

*Primary Examiner* — Jeffry H Aftergut
(74) *Attorney, Agent, or Firm* — Brennan, Manna & Diamond, LLC

(57) ABSTRACT

The present invention relates to an improved drywall finish and joint compound comprised of a mixture of fractured aluminum oxide, glass bead, calcium sulfate, calcium carbonate, magnesium aluminum phyllosilicate, aluminum silicate hydroxide, polyvinyl acetate, polyvinyl alcohol, metamorphic mineral, sodium bicarbonate, silicon and aluminides, talc, kaolin, and metal oxide. The improved drywall finish and joint compound is capable of adhering to drywall, wood, concrete, brick, stone, steel and other surfaces, and can be applied using a conventional trowel or similar device, cures quickly, and eliminates the need for taping and bedding. The compound saves extensive time and labor when installing, repairing or working with drywall.

20 Claims, 3 Drawing Sheets

ENHANCED ADHESIVE DRYWALL FINISH AND JOINT COMPOUND AND METHOD OF USE

CROSS-REFERENCE TO RELATED APPLICATION

The present application claims priority to, and the benefit of, U.S. Provisional Application No. 63/155,538, which was filed on Mar. 2, 2021, and is incorporated herein by reference in its entirety.

FIELD OF THE INVENTION

The present invention relates generally to the field of drywall finish and joint compounds. More specifically, the present invention relates to a novel drywall finish and joint compound and method of application thereof, wherein the novel drywall finish and joint compound is applied using conventional means, such as a trowel, to repair and install drywall onto plasterboard, wood, concrete and other surfaces without the need for bonder or bonding agents as typically required. The joint compound eliminates the need to use a bonding agent, in many cases taping and bedding, and has a much shorter cure time than conventional drywall finishing compounds, thereby reducing time and labor costs for the installation and repair of drywall/plaster finishes while also providing a hard finish with natural fire-retardant qualities. The joint compound has a consistency and color of plaster, and can be mixed with existing drywall mud or plaster to improve the characteristics thereof. Accordingly, the present disclosure makes specific reference thereto. Nonetheless, it is to be appreciated that aspects of the present invention are also equally applicable to other like applications, devices and methods of manufacture.

BACKGROUND

By way of background, drywall is a construction material used to create walls and ceilings in buildings. It's also used to create many design features, including eaves, arches and other architectural specialties. The name "drywall" refers to the fact that walls made of the material are installed without the use of water, and drywall has replaced the use of plaster and laths in most building construction. Though drywall has been a great improvement over the use of plaster and laths, the installation of drywall still requires significant time and labor that contributes to the cost of building construction and repair. Furthermore, a plaster finish typically requires a more laborious and expensive process.

The installation of drywall or plasterboard requires many related materials and numerous steps. The materials needed to install drywall include adhesives, screws or staples, a drywall finishing compound of plaster or mud, trowels, mesh or paper tape and sanding tools. The steps involved in the installation of drywall include the application of adhesives to the studs or other surfaces upon which the drywall sheets will be installed, the application of drywall sheets to the studs or other surfaces, the use of screws or staples to secure the sheets, the use of a trowel to apply a drywall finishing compound to the gaps between drywall sheets that occur at joints and seams and to cover the screws or staples with the drywall finishing compound, the application of tape over joints and corners, the use of a trowel to apply a drywall finishing compound over the tape, called bedding the tape, the drying of the drywall finishing compound, the use of sanding tools to sand the dried drywall finishing compound, the reapplication of the drywall finishing compound to the taped and sanded joints and seams, the drying of the reapplied drywall finishing compound and the re-sanding of the dried drywall finishing compound. The application and sanding of drywall finishing compound to the joints and seams is an iterative process that continues until an acceptably smooth surface is achieved. The process is labor intensive and may extend over several days as the drywall finishing compound needs to dry, often overnight, with each iteration in the process. This labor intensive and time-consuming process significantly contributes to the cost of drywall installation and repair.

Therefore, there exists a long-felt need in the art for an improvement in drywall materials and methods. There is a long-felt need for a drywall finish and joint compound that reduces the need for taping and bedding in some use cases, that can be easily applied to drywall joints and corners, and cures within an hour. In addition, there exists a long-felt need for a drywall finish and joint compound that provides a mesh-like bond to a new or existing drywall surface that eliminates the need to use a bonding agent, thereby reducing total cost, labor, and time. Additionally, there is a long-felt need in the art for an improved drywall finish and joint compound that can still be applied using traditional application means. Moreover, there is a long-felt need in the art for an improved drywall finish and joint compound that increases the strength and durability of the drywall or other surface. Furthermore, there is a long-felt need in the art for a drywall finish and joint compound that can act as an agent to bond drywall, plaster, and other related substrates to other surfaces such as concrete and wood. Finally, there is a long-felt need in the art for a joint compound that saves time, labor and costs when installing and repairing drywall and can give the appearance and performance of plaster without the need for plaster board.

The subject matter disclosed and claimed herein, in one embodiment thereof, comprises a novel drywall finishing compound that can be used in some situations to eliminate the need for taping and bedding and requires less time to dry or cure, thereby reducing labor costs and construction time. The deletion of steps and the reduction in curing time improve the current methods and materials of drywall installation, thereby reducing overall material and labor costs.

The improved drywall finishing compound is comprised of a mixture of fractured aluminum oxide, glass bead, calcium sulfate, calcium carbonate, magnesium aluminum phyllosilicate, aluminum silicate hydroxide, polyvinyl acetate, polyvinyl alcohol, metamorphic mineral, sodium bicarbonate, silicon and aluminides, talc, kaolin, and metal oxide.

The novel and improved drywall finishing compound of the present invention accomplishes all of the forgoing objectives. By eliminating the step of applying a bonding or bonder and reducing the need for taping and bedding during the installation of drywall or plaster board and providing faster curing time, the novel drywall finishing compound reduces construction time and labor costs in the installation and repair of drywall or to create a plasterboard imitation that maintains a plaster finish. The compound also strengthens and hardens the drywall structure while also providing natural fire-retardant qualities. The compound can be used in any project involving the repair of drywall, plasterboard, or the installation of finish on surfaces such as wood, stone, brick, steel or concrete, regardless of whether the surface is painted or not painted without the need for a bonding agent.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a novel drywall finishing compound which is an improvement over currently available conventional drywall finishing compounds. The improved drywall finishing compound is comprised of a mixture of fractured aluminum oxide, calcium sulfate, calcium carbonate, hydrated magnesium, magnesium aluminum phyllosilicate, aluminum silicate hydroxide, polyvinyl acetate, polyvinyl alcohol, metamorphic mineral, sodium bicarbonate, silicon and aluminides, talc, glass beads, kaolin, and metal oxide.

The improved novel drywall finishing compound does not require a bonding agent, which is needed when using conventional drywall finishing compounds and plasterboard finishes, and cures within an hour unlike the conventional drywall finishing compound which may require a day to cure and multiple layers that must be sanded. In various embodiments, the novel drywall finishing compound is an aqueous slurry, or may be non-aqueous. The compound may also be mixed with a conventional drywall finishing compound to enhance adhesive properties of the conventional drywall finishing compound and perform in the manner of a plaster finish.

The compound provides a hard finish with natural fire-retardant qualities. In one embodiment, the compound is made of fractured aluminum oxide is 10-12% by weight percentage and sodium bicarbonate is 3-5%. In another embodiment, the fractured aluminum oxide is 12-15% by weight percentage, glass bead 15-20% by weight percentage and sodium bicarbonate is 5-7%.

A method of installing drywall onto wood, stone, brick, steel, concrete, or other surfaces is also disclosed. The method includes providing a novel drywall finishing compound, the novel drywall finishing compound includes a mixture of fractured aluminum oxide, calcium sulfate, calcium carbonate, hydrated magnesium, magnesium aluminum phyllosilicate, aluminum silicate hydroxide, polyvinyl acetate, polyvinyl alcohol, metamorphic mineral, sodium bicarbonate, silicon and aluminides, and metal oxide. The compound can then be applied along the joints and seams between drywall surfaces and over the staples or screws that secure the drywall. Next, the drywall finishing compound can be allowed to cure. Then, the drywall and drywall finishing compound can be sanded to achieve a smooth finish. Numerous benefits and advantages of this invention will further become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. However, these aspects are indicative of but a few of the various ways in which the principles disclosed herein can be employed and are not intended to include all such aspects and their equivalents. Other advantages and novel features will become inherently apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
FIG. 1 illustrates a block diagram view showing the various ingredients of one potential embodiment of a drywall curing compound of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in each embodiment, any of the features described herein from different embodiments may be combined.

As noted above, there exists a long-felt need in the art for an improvement in drywall materials and methods. There is a long-felt need for a drywall finish and joint compound that reduces the need for taping and bedding in some use cases, that can be easily applied to drywall joints and corners, and cures within an hour. In addition, there exists a long-felt need for a drywall finish and joint compound that provides a mesh-like bond to a new or existing drywall surface that eliminates the need to use a bonding agent, thereby reducing total cost, labor, and time. Additionally, there is a long-felt need in the art for an improved drywall finish and joint compound that can still be applied using traditional application means. Moreover, there is a long-felt need in the art for an improved drywall finish and joint compound that increases the strength and durability of the drywall or other surface. Furthermore, there is a long-felt need in the art for a drywall finish and joint compound that can act as an agent to bond drywall, plaster, and other related substrates to other surfaces such as concrete and wood. Finally, there is a long-felt need in the art for a joint compound that saves time, labor and costs when installing and repairing drywall and can give the appearance and performance of plaster without the need for plaster board.

The present invention, in one exemplary embodiment, is a novel method of installing drywall finish onto wood or another surface. The method includes providing an improved novel drywall finishing compound, applying the improved novel drywall finishing compound on a drywall surface and into the spaces between drywall surfaces, allowing the improved novel drywall finishing compound to cure or harden, and then sanding the surface of the compound and the drywall to the desired smooth finish. The improved drywall finishing compound includes a mixture of fractured aluminum oxide, calcium sulfate, glass beads, kaolin, calcium carbonate, magnesium aluminum phyllosilicate, aluminum silicate hydroxide, polyvinyl acetate, polyvinyl alcohol, metamorphic mineral, sodium bicarbonate, silicon and aluminides, talc, and metal oxide; applying the drywall finishing compound on a drywall surface and seams for curing and fixing, and drying the drywall finishing compound for fixing and curing the drywall.

Referring initially to the drawings, FIG. 1 illustrates a block diagram view showing ingredients of the novel drywall finishing compound 100 of the present invention in accordance with the disclosed architecture. The present invention discloses a novel drywall finishing compound that dries rapidly, conceals drywall joints, has enhanced adhesive properties, and may eliminate the need for tape and bedding in installation of the drywall in most cases (unless large gaps are present due to poor installation). The drywall finishing compound 100 can also be applied to other surfaces such as, but not limited to, concrete, plasterboard, wood, etc., regardless of whether the surface is painted, to act as a bonding and cementing agent. The compound 100 can be formed in both aqueous and non-aqueous forms.

The novel drywall finishing compound 100 preferably has a non-aqueous composition of fractured aluminum oxide 102, calcium sulfate 104, calcium carbonate 106, glass bead 108, magnesium aluminum phyllosilicate 110, aluminum silicate hydroxide 112, polyvinyl acetate 114, polymer bonder 116, polyvinyl alcohol 118, metamorphic mineral 120, talc 122, sodium bicarbonate 124, kaolin 126, and silicon and aluminides and metal oxide 136. The aqueous form of the composition may also involve adding water. The compound can be applied to drywall and other surfaces using traditional means of application, such as a trowel.

The fractured aluminum oxide 102 gives the material enhanced adhesive properties. The fractured aluminum oxide 102 is inert and chemically resistant. Fractured aluminum oxide 102 also provides the drywall finishing compound with low-shrinking properties, allows the drywall finishing compound to be applied smoothly, while also providing a very strong bond. The calcium sulfate 104 used may be any natural or chemical gypsum material of either high or low grade and of appropriate feed size for grinding. The calcium sulfate 104 contains calcium (Ca) in the range 23.3%-30%. Calcium carbonate (Limestone) 106 provides the mud properties that allow the drywall finishing compound to be applied and shaped using a trowel. Limestone 106 is permeable and allows for the diffusion and evaporation of moisture. Glass bead 108 hardens and smooths the finish of the compound 100.

Magnesium aluminum phyllosilicate 110 is a naturally occurring clay comprised of magnesium, aluminum, silica and oxygen. The use of the magnesium aluminum phyllosilicate 110 is to provide a white/off-white powder texture to the compound and the ingredient also increases viscosity and binding properties. Aluminum silicate hydroxide 112 provides a powder texture to the compound and acts as a filler for the compound. Additional ingredients such as silicon and aluminides, and metal oxide 136 are also used in formation of the drywall finishing compound of the present invention to provide functional and visual results. Polymer bonder 116 further stabilizes the compound 100. Talc 122 stabilizes moisture and controls drying time. Kaolin 126 acts as a clay filler to hold moisture, stabilize the compound 100, and improve drying time.

Polyvinyl acetate 114 is an important constituent of the compound and provides an adhesive property to the compound. Polyvinyl acetate 114 is prepared by the polymerization of vinyl acetate. Further, polyvinyl acetate 114 helps the drywall finishing compound produce clear and hard films that have good weather resistance and also withstand water, grease, oil and petroleum fuels.

Polyvinyl alcohol 118 provides adhesive properties to the compound. Polyvinyl alcohol 118 also provides binding properties to the drywall finishing compound. An advantage of polyvinyl alcohol 118 is that it is specifically advantageous for paper and paperboard products and helps in quick bonding. Metamorphic mineral 120 (ex. marble dust) provides a textured and striped appearance to the compound and may provide various colors to the drywall finishing compound.

Sodium bicarbonate 124 functions as an accelerator for gluing properties of the drywall finishing compound 100. Further, sodium bicarbonate helps in strengthening the compound when applied to drywall or on any other surface. This allows the drywall finishing compound 100 to plug holes, seal gaps and have a high durability.

In one embodiment of the present invention, the fractured aluminum oxide compound can be mixed with existing drywall mud/plaster to give said mud/plaster the same enhanced adhesive properties as the compound 100 of the present invention.

In one embodiment, amounts of all constituents are measured as indicated in Table 1. However, it should be appreciated that the given percentages are only exemplary, and may differ with respect to each ingredient's respective percentages in differing embodiments of the present invention.

TABLE 1

| Ingredient | percentage by weight (% w/w) |
| --- | --- |
| Fractured aluminum oxide | 10-12 |
| Calcium sulfate | 2 |
| Calcium carbonate | 4 |
| Glass Bead | 10-12 |
| Magnesium aluminum phyllosilicate | 2 |
| Aluminum silicate hydroxide | 1 |
| Polyvinyl acetate | 8-10 |
| Polymer Bonder | 20 |
| Polyvinyl alcohol | 8-10 |
| Talc | 15-20 |
| Sodium bicarbonate | 3-5 |
| Kaolin | 3-6 |
| Metamorphic mineral | 1 |
| Metal oxides, silicon, and aluminides | 2-5 |

In another embodiment, amounts of all constituents are measured as indicated in Table 2. However, it should be appreciated that the given percentages are only exemplary, and may differ with respect to each ingredients respective percentages in differing embodiments of the present invention.

TABLE 2

| Ingredient | percentage by weight (% w/w) |
| --- | --- |
| Fractured aluminum oxide | 12-15 |
| Calcium sulfate | 1 |
| Calcium carbonate | 2-3 |
| Glass Bead | 12-15 |
| Magnesium aluminum phyllosilicate | 1-3 |
| Aluminum silicate hydroxide | 2-4 |
| Polyvinyl acetate | 10-12 |
| Polymer Bonder | 20 |
| Polyvinyl alcohol | 9-11 |
| Talc | 15-20 |

TABLE 2-continued

| Ingredient | percentage by weight (% w/w) |
|---|---|
| Sodium bicarbonate | 5-7 |
| Kaolin | 3-6 |
| Metal oxides, silicon, and aluminides | 2-5 |

Figure 2:
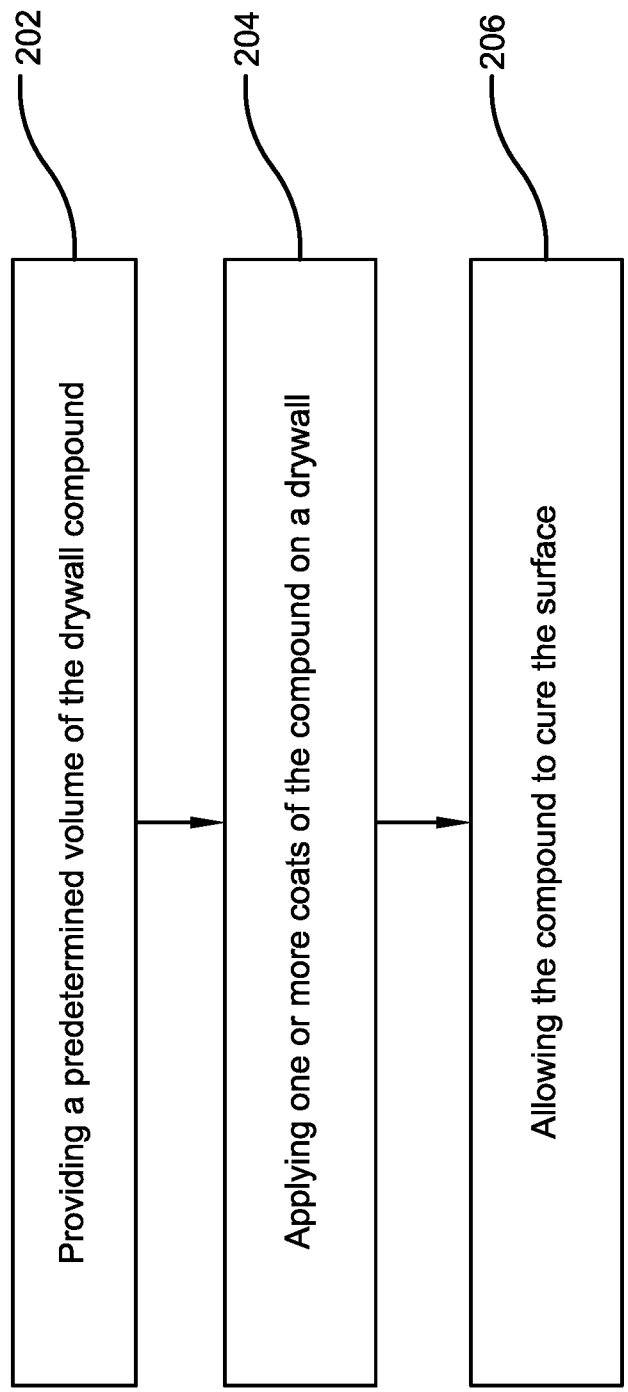
FIG. 2 illustrates a flow diagram showing exemplary steps performed in applying one potential embodiment of a drywall curing compound of the present invention on drywall or on any surface in accordance with the disclosed architecture.

FIG. 2 illustrates a flow diagram showing exemplary steps performed in applying the novel drywall finishing compound 100 of the present invention on a drywall or on any surface in accordance with the disclosed architecture. As shown, the user initially provides a predetermined volume of the drywall finishing compound 100 (Step 202). Then, the user applies one or more coats of the drywall finishing compound 100 on drywall, concrete, wood, or another surface using a traditional applicator such as a trowel (Step 204). Thereafter, the user allows the compound to cure for a sufficient amount of time (Step 206).

Figure 3:
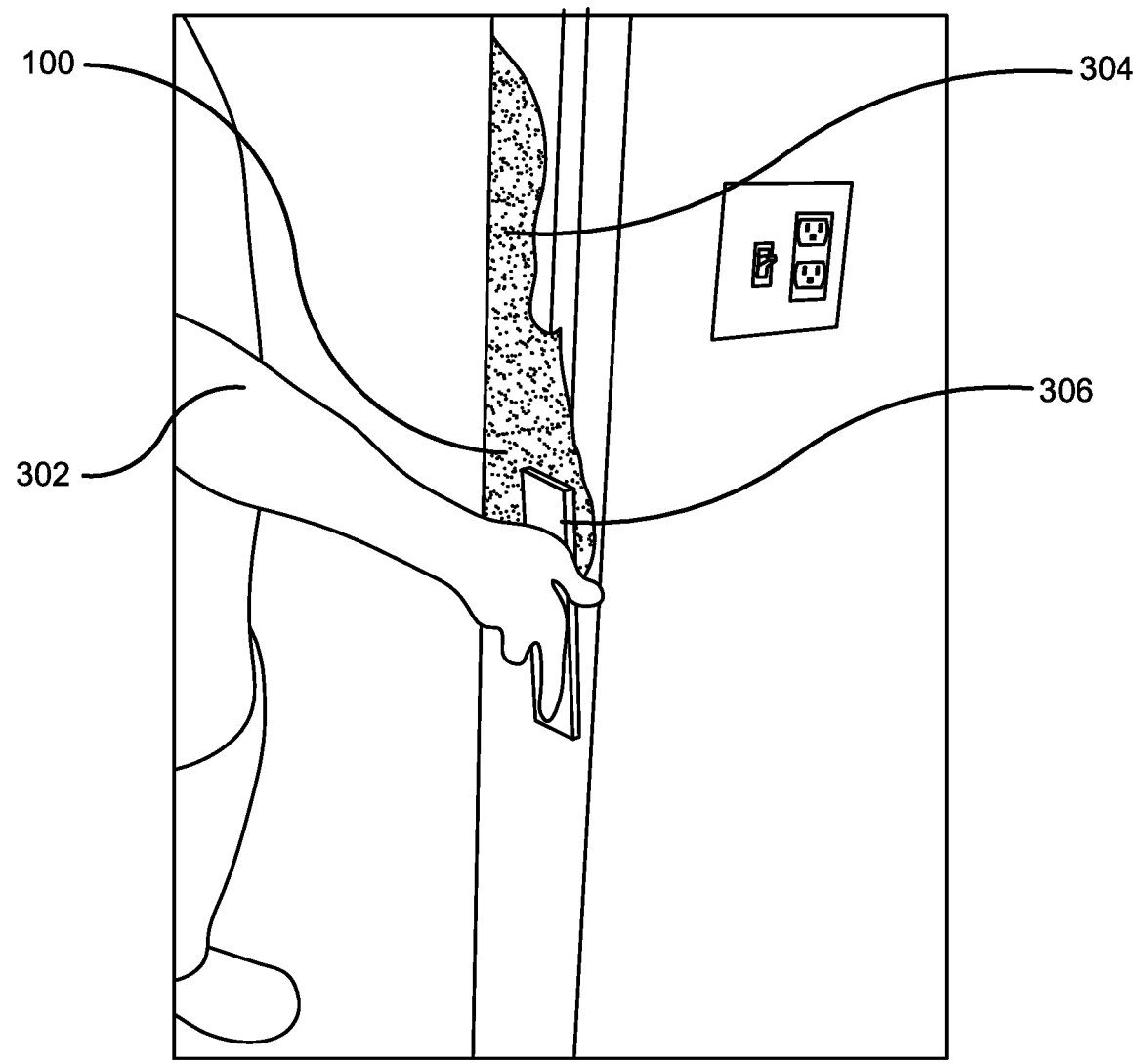
FIG. 3 illustrates a perspective view showing a user applying one potential embodiment of a drywall curing compound of the present invention on a drywall in accordance with the disclosed architecture.

FIG. 3 illustrates a perspective view showing a user applying the drywall finishing compound 100 of the present invention on a drywall in accordance with the disclosed architecture. As shown, a user 302 can apply the drywall finishing compound 100 on the drywall 304 using a trowel 306. It should be appreciated that the improved drywall finishing compound 100 eliminates the use of bonder, taping and bedding in most cases; thereby, reducing the time, labor, and cost of installing drywall 304.

Certain terms are used throughout the following description and claims to refer to particular features or components. As one skilled in the art will appreciate, different persons may refer to the same feature or component by different names. This document does not intend to distinguish between components or features that differ in name but not structure or function. "Novel drywall finishing compound," "improved drywall finishing compound", "improved novel drywall finishing compound," and "drywall finishing compound", unless otherwise specified, refer to the present invention, the improved drywall finishing compound 100.

Notwithstanding the forgoing, the improved drywall finishing compound 100 of the present invention can be of any suitable configuration as is known in the art without affecting the overall concept of the invention, provided that it accomplishes the above stated objectives. One of ordinary skill in the art will appreciate that the configuration and material of the improved drywall finishing compound 100 as shown in the FIGS. are for illustrative purposes only, and that many other configuration and composition of the drywall curing compound 100 are well within the scope of the present disclosure.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A drywall finishing compound comprising:
a fractured aluminum oxide;
a calcium sulfate;
a calcium carbonate;
a glass bead;
a magnesium aluminum phyllosilicate;
an aluminum silicate hydroxide;
a polyvinyl acetate;
a polyvinyl alcohol;
a sodium bicarbonate;
a polymer bonder;
a talc;
an kaolin;
a metamorphic mineral;
a metal oxide;
a silicon; and
an aluminide.
2. The drywall finishing compound of claim 1, wherein:
the fractured aluminum oxide comprises 10-12 weight percent of the drywall finishing compound;
the calcium sulfate comprises approximately 2 weight percent;
the calcium carbonate comprises approximately 2 weight percent;
the magnesium aluminum phyllosilicate comprises approximately 2 weight percent;
the aluminum silicate hydroxide comprises approximately 1 weight percent;
the polyvinyl acetate comprises 8-10 weight percent;
the polyvinyl alcohol comprises 8-10 weight percent;
the sodium bicarbonate comprises 3-5 weight percent;
the polymer bonder comprises 10-15 weight percent;
the glass bead comprises 15-20 weight percent;
the metamorphic mineral comprises approximately 1 weight percent;
the talc comprises 15-20 weight percent;
the kaolin comprises 3-6 weight percent; and
the metal oxide, the silicon and the aluminides collectively comprises from 2-5 weight percent.
3. The drywall finishing compound of claim 1, wherein the drywall finishing compound is an aqueous slurry.
4. The drywall finishing compound of claim 1, wherein the drywall finishing compound dries within one hour of application.
5. The drywall finishing compound of claim 1, wherein the drywall finishing compound enhances an adhesive property of a conventional drywall finishing compound when mixed with the conventional drywall finishing compound and provides a plaster finish.
6. An drywall finishing compound comprising:
a fractured aluminum oxide comprising 12-15 weight percent of the drywall finishing compound;
a calcium sulfate comprising approximately 1 weight percent;
a calcium carbonate comprising 2-3 weight percent;
a magnesium aluminum phyllosilicate comprising 1-3 weight percent;

an aluminum silicate hydroxide comprising 2-4 weight percent;
a polyvinyl acetate comprising 10-12 weight percent;
a polyvinyl alcohol comprising 9-11 weight percent;
a sodium bicarbonate comprising 5-7 weight percent;
a polymer bonder comprising 12-15 weight percent;
a glass bead comprising 15-20 weight percent;
a metamorphic mineral comprising approximately 1 weight percent;
a talc comprising 15-20 weight percent;
a kaolin 3-6 weight percent; and
a combination of metal oxides, silicon and aluminides comprising 2-5 weight percent.

7. The drywall finishing compound of claim 6, wherein the drywall finishing compound is an aqueous slurry.

8. The drywall finishing compound of claim 6, wherein the drywall finishing compound is nonaqueous.

9. The drywall finishing compound of claim 6, wherein the drywall finishing compound dries within one hour of application.

10. The drywall finishing compound of claim 6, wherein the drywall finishing compound enhances an adhesive property of a conventional drywall finishing compound when mixed with the conventional drywall finishing compound.

11. A method of installing or repairing a drywall comprised of:
providing a drywall finishing compound;
applying the drywall finishing compound onto a plurality of drywall surfaces and into a plurality of spaces between the plurality of drywall surfaces;
allowing the drywall finishing compound to cure; and,
sanding the plurality of drywall surfaces and the drywall finishing compound to achieve a smooth finish, wherein the drywall finishing compound comprises a fractured aluminum oxide, a calcium sulfate, a calcium carbonate, a magnesium aluminum phyllosilicate, an aluminum silicate hydroxide, a polyvinyl acetate, a polyvinyl alcohol, a sodium bicarbonate, a metamorphic mineral, a metal oxide, a silicon, and an aluminide.

12. The method of installing or repairing a drywall of claim 11, wherein:
the fractured aluminum oxide comprises 10-12 weight percent of the drywall finishing compound;
the calcium sulfate comprises approximately 2 weight percent;
the calcium carbonate comprises approximately 2 weight percent;
the magnesium aluminum phyllosilicate comprises approximately 2 weight percent;
the aluminum silicate hydroxide comprises approximately 1 weight percent;
the polyvinyl acetate comprises 8-10 weight percent;
the polyvinyl alcohol comprises 8-10 weight percent;
the sodium bicarbonate comprises 3-5 weight percent;
a polymer bonder 10-15 weight percent;
a glass bead comprises 20-25 weight percent;
the metamorphic mineral comprises approximately 1 weight percent;
a talc comprises 15-20 weight percent;
a kaolin comprises 3-6 weight percent; and
the metal oxide, the silicon and the aluminides collectively comprises from 2-5 weight percent.

13. The method of installing or repairing drywall of claim 12, wherein the drywall finishing compound is an aqueous slurry.

14. The method of installing or repairing drywall of claim 12, wherein the drywall finishing compound is a nonaqueous slurry.

15. The method of installing or repairing drywall of claim 12, wherein the drywall finishing compound cures within one hour.

16. The method of installing or repairing drywall of claim 11, wherein:
the fractured aluminum oxide comprises 12-15 weight percent of the drywall finishing compound;
the calcium sulfate comprises approximately 1 weight percent;
the calcium carbonate comprises 2-3 weight percent;
the magnesium aluminum phyllosilicate comprises 1-3 weight percent;
the aluminum silicate hydroxide comprises 2-4 weight percent;
the polyvinyl acetate comprises 10-12 weight percent;
the polyvinyl alcohol comprises 9-11 weight percent;
the sodium bicarbonate comprises 5-7 weight percent;
a polymer bonder 12-15 weight percent;
a glass bead 20-24 weight percent;
the metamorphic mineral comprises approximately 1 weight percent;
a talc comprises 15-20 weight percent;
a kaolin comprises 3-6 weight percent; and
the combination of metal oxides, silicon and aluminides comprises 2-5 weight percent.

17. The method of installing drywall of claim 16, wherein the drywall finishing compound is an aqueous slurry.

18. The method of installing drywall of claim 16, wherein the drywall finishing compound is a nonaqueous slurry.

19. The method of installing or repairing drywall of claim 16, wherein the drywall finishing compound cures within one hour.

20. The method of installing or repairing drywall of claim 11, wherein the drywall finishing compound enhances an adhesive property of a conventional drywall finishing compound when mixed with the conventional drywall finishing compound and provides a plaster finish.

* * * * *